(12) United States Patent
Sleder, Sr.

(10) Patent No.: US 6,342,775 B1
(45) Date of Patent: Jan. 29, 2002

(54) AUTOMATIC BATTERY SWITCHING CIRCUIT FOR A MARINE PROPULSION SYSTEM

(75) Inventor: Richard L. Sleder, Sr., Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/577,911

(22) Filed: May 24, 2000

(51) Int. Cl.[7] .................................................. H02J 7/00
(52) U.S. Cl. ........................................ 320/116; 320/117
(58) Field of Search ................................ 320/116, 117, 320/120, 121; 307/71, 66

(56) References Cited

U.S. PATENT DOCUMENTS

| | | | |
|---|---|---|---|
| 5,107,198 A | | 4/1992 | Meyer et al. .................. 322/60 |
| 5,233,282 A | | 8/1993 | Iwashita ...................... 320/117 |
| 5,686,819 A | | 11/1997 | Iwatani et al. ................. 322/25 |
| 5,773,959 A | * | 6/1998 | Merritt et al. ............... 320/120 |
| 5,898,291 A | * | 4/1999 | Hall ........................... 320/121 |
| 6,239,579 B1 | * | 5/2001 | Dunn et al. .................. 320/121 |

* cited by examiner

Primary Examiner—Peter S. Wong
Assistant Examiner—Lawrence Luk
(74) Attorney, Agent, or Firm—William D. Lanyi

(57) ABSTRACT

A battery switching circuit provides a mechanism by which a plurality of electrical storage batteries can be alternatively connected in parallel or series based on the position of a manually controlled joystick of a marine positioning and maneuvering system. When the joystick is in a neutral position in which no docking motion is demanded by the marine vessel operator, the storage batteries are connected in parallel so that they can benefit from charging by an alternator or generator associated with an internal combustion engine. If the joystick is moved out of its neutral position, the batteries are immediately connected in series to provide power to a plurality of electric motors that are used to drive a plurality of impellers of the docking system.

28 Claims, 3 Drawing Sheets

AUTOMATIC BATTERY SWITCHING CIRCUIT FOR A MARINE PROPULSION SYSTEM

BACKGROUND OF THE INVENTION

1. Field of the Invention

The present invention is generally related to a battery switching circuit for a marine propulsion system and, more particularly, to a switching circuit that responds automatically to changes in the position of a manually controlled mechanism.

2. Description of the Prior Art

Many different types of marine vessels rely on electric storage batteries as the power source for an auxiliary marine propulsion device, such as a trolling motor. In some marine vessels, the propulsion device comprises an internal combustion engine and a related marine drive, such as an outboard motor or a stern drive unit, and an auxiliary drive comprising an electric motor, such as a trolling motor. It is known to those skilled in the art that the internal combustion engine can be used to drive an alternator or generator which provides charging voltage to the electric storage batteries. It is also known to those skilled in the art that the electric storage batteries can be used as a power source for the electric trolling motor or similar marine propulsion device.

U.S. Pat. No. 5,233,282, which issued to Iwashita on Aug. 3, 1993, describes a battery system for a marine propulsion unit. The system is intended for use in connection with a pair of marine propulsion units, one of which is powered by an internal combustion engine that drives a generator and the other of which is actuated by an electric motor. A pair of actuating batteries are in circuit with the electric motor and the generator and are adapted to selectively provide power to the electric motor or receive a charge from the generator in a response to a main switch which is also used to control the starting of the internal combustion engine. A pair of contact relays, responsive to the main switch, are used to adjust the circuitry of the battery system so that the actuating batteries are either connected in parallel in the charging state or connected in series in the actuating state.

U.S. Pat. No. 5,686,819, which issued to Iwatani et al on Nov. 11, 1997, describes a control apparatus for an AC generator of a motor vehicle. The apparatus is of high reliability and has substantially no adverse influence to an outboard battery and an onboard high-voltage load by suppressing to a passable minimum variation of a regulating voltage which may occur as contacts of a detection voltage change-over switch are degraded. An AC generator of a motor vehicle includes a rectifier circuit for rectifying an output of the AC generator including a field coil, an output changeover switch for changing over an output of the rectifier circuit to either one of a battery and a high-voltage electric load mounted on the motor vehicle, and a voltage regulator for regulating an exciting current supplied to the field coil in dependence on a terminal voltage of the battery as detected on a charging line connected to the battery by way of the output change-over switch upon charging of the battery from the output of the rectifier circuit, to thereby regulate the output voltage of the AC generator.

U.S. Pat. No. 5,107,198, which issued to Meyer et al on Apr. 21, 1992, describes an apparatus for charging a battery in a motor vehicle with a self-exciting generator. The apparatus for charging a battery is particularly applicable for a motor vehicle and comprises a self-exciting generator. The generator pre-excitation is improved during starting in that an additional relay is triggered via the starter arrangement and the relay connects the battery with the exciting winding via an additional line when starting and improves the pre-excitation. The additional relay contains a delay circuit, so that the pre-excitation is improved via the additional line some time after the starting process. The additional line or current branch can contain the relay switch of the additional relay, a resistor and a diode connected electrically in series and the battery is connected with the exciting winding of the generator when the additional relay is energized. A capacitor can be connected in parallel with the additional relay coil to provide an appropriate time delay.

U.S. application Ser. No. 09/078,976 which was filed by Alexander et al on May 14, 1998, and assigned to the assignee of the present application, discloses a marine vessel docking control system. The docking control system comprises a plurality of thrusters which can, in turn, comprise individual impellers located within tunnels formed in the hull of a marine vessel. The thrusters are controlled in such a way that a manually controlled joystick allows an operator to selectively maneuver the marine vessel by merely positioning the joy stick in the direction that the operator wishes the marine vessel to move. The thrusters can employ internal impellers or propellers located within the individual tunnel-shaped conduits within the hull. A logic circuit or software system automatically converts the hand controlled movements of the joy stick to combinations of thrust for each of a plurality of electric motors so that the combined effective vectors of force provided by the plurality of impellers results in the desired movement of the marine vessel.

The patents described above are hereby expressly incorporated by reference in the description of the present invention.

It would be significantly beneficial if a system could be provided that regulates the circuit configuration of a plurality of batteries so that the batteries are automatically placed in a charging mode circuit configuration when a hand controlled mechanism is in a neutral position, but in a power providing circuit configuration with respect to a plurality of electric motors when the hand controlled mechanism is not in a neutral position but, instead, is in a position that requires power to be provided to a plurality of impellers driven by electric motors.

SUMMARY OF THE INVENTION

The battery switching circuit for a marine propulsion system made in accordance with the present invention comprises first, second, and third batteries which each have a positive terminal and a negative terminal. The circuit also comprises a source of charging power such as an alternator or generator that is driven by an internal combustion engine. The internal combustion engine can be part of an outboard motor or a sterndrive marine propulsion system. It further comprises a manually controlled electrically operated device having an active state and an inactive state. In a preferred embodiment of the present invention, the electrically operated device is a boat docking system which comprises a controller and a plurality of electric motors which are each provided with a propeller or impeller.

A preferred embodiment of the present invention also comprises first, second, third, and fourth switches that are each selectively connected to one or more of the batteries. A switch controller is provided for causing the first, second, third, and fourth switches to be placed in a first condition when the manually controlled electrically operated device is in the inactive state and for causing the first, second, third, and fourth switches to be placed in a second condition when the manually controlled electrically operated device is in the active state. In a preferred embodiment of the present invention, the switches are all in their first state when in the first condition, and in their second state when in the second condition.

A preferred embodiment of the present invention further comprises a fourth battery that is used to start the internal combustion engine and is connected with its positive terminal connected to the source of charging power and its negative terminal connected to a point of ground potential so that the fourth battery receives a charge when the internal combustion engine is operating and is available to start the internal combustion engine when needed. The fourth battery and the first, second, and third batteries are isolated by diodes such that the fourth, or engine, battery cannot discharge into the first, second, or third batteries and their load. The fourth, or engine, battery is therefore preserved for engine starting purposes. Also, the diode isolation prevents the first, second, and third batteries from discharging into the fourth battery in the even of a relay or switch failure.

A hand operable control mechanism, such as a joystick, can be connected in signal communication with the manually controlled electrically operated device. The source of charging power can be an alternator or generator driven by the crankshaft of the internal combustion engine.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
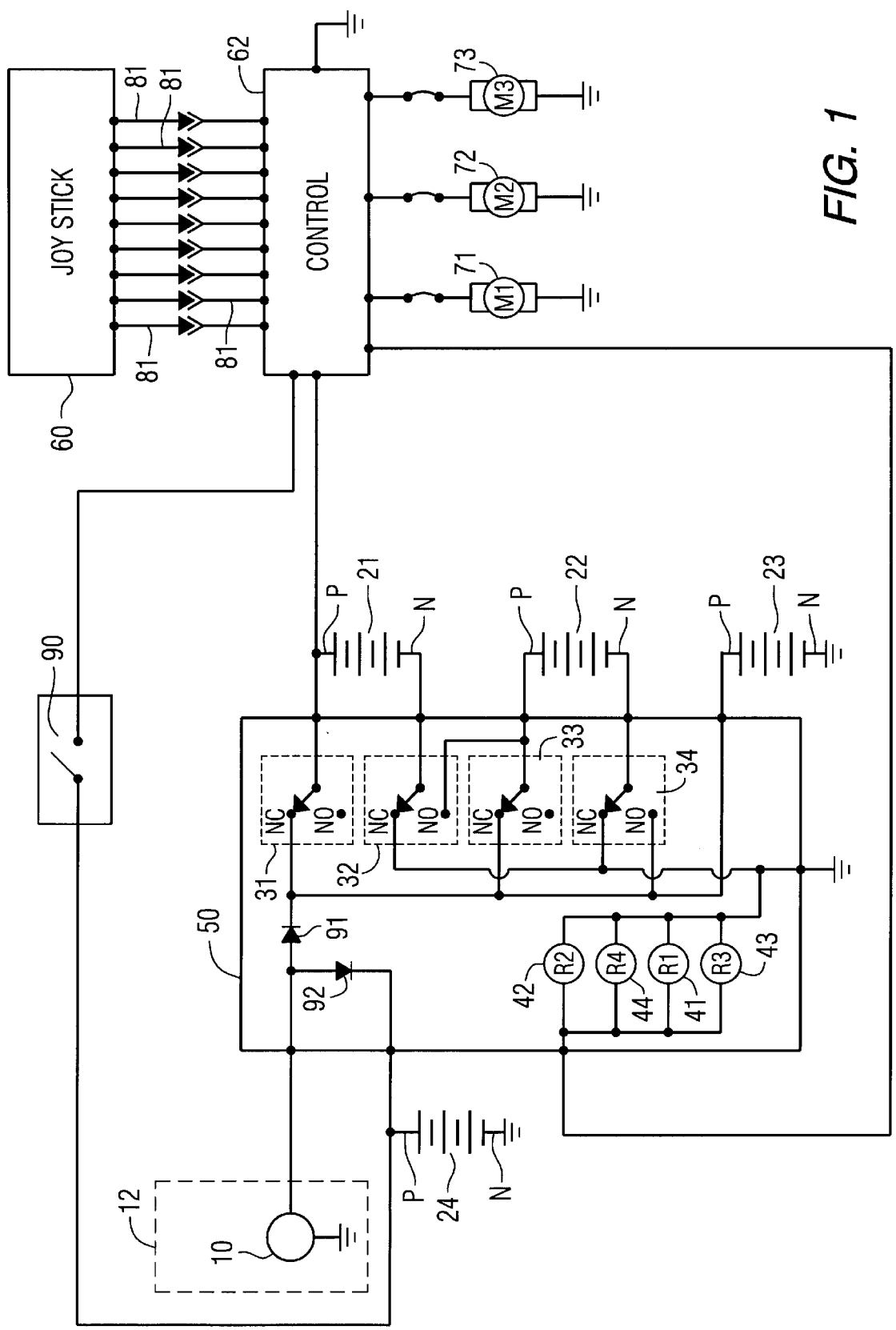
FIG. 1 shows the circuit of the present invention with its switches in a first state.

Throughout the description of the preferred embodiment of the present invention, like components will be identified by like reference numerals.

FIG. 1 is a schematic representation of the present invention. A source of charging power 10 is shown within a dashed box 12 which represents an internal combustion engine of a marine propulsion system. The internal combustion engine 12 can be incorporated within an outboard motor, a sterndrive propulsion system, or an inboard propulsion system. The source of charging power 10 can be a generator or alternator driven by the internal combustion engine 12. Also shown in FIG. 1 are a first battery 21, a second battery 22, and a third battery 23. The first, second, and third batteries are associated with a switching network that comprises a first switch 31, a second switch 32, a third switch 33, and a fourth switch 34. The switches, 31–34, are activated and deactivated in response to a first relay coil 41, a second relay coil 42, a third relay coil 43, and a fourth relay coil 44, respectively. FIG. 1 shows the four switches, 31–34, in their deactivated, or normally closed, states. An automatic battery switch isolator 50 comprises four relay coils, 41–44, and four switches, 31–34, with diodes, 91 and 92, for isolation purposes.

A control mechanism 62 is provided for causing the four switches to be in a first condition when a manually controlled electrically operated device 60 is in an inactive, or normally opened, state. The control mechanism 62 also causes the four switches, 31–34, to be in a second condition when the manually controlled electrically operated device 60 is in an active state.

Figure 2:
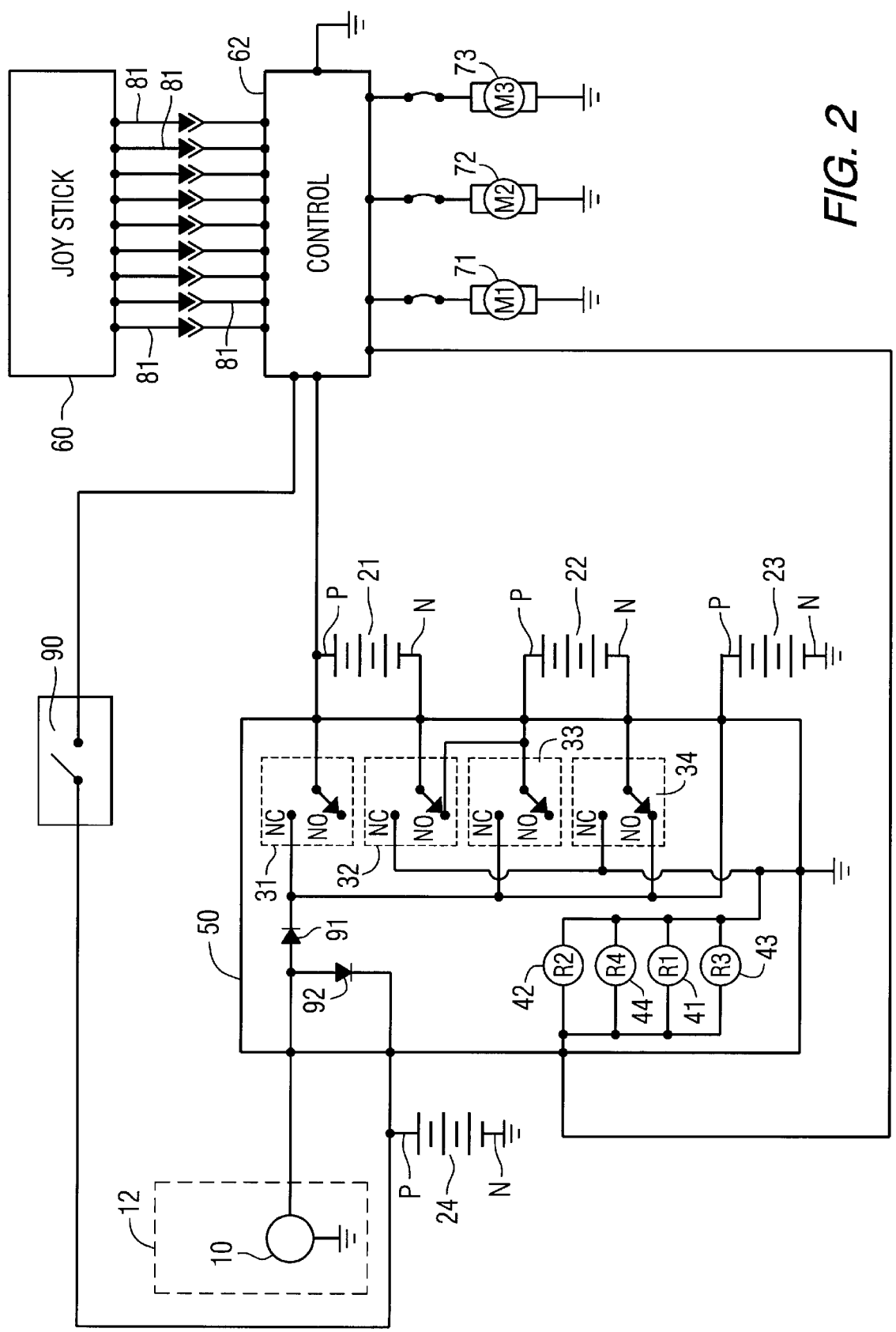
FIG. 2 is similar to FIG. 1, but with the switches in a second state.

With continued reference to FIG. 1, it can be seen that the first 21, second 22, and third 23 batteries each have a positive terminal identified by reference letter P and a negative terminal identified by reference letter N. The first switch 31 is connected to the first battery 21 and has a first state, represented in FIG. 1, in which the positive terminal of the first battery 21 is connected to the source of charging power 10 and a second state, shown in FIG. 2, in which the positive terminal of the first battery 21 is disconnected from the source of charging power 10. As will be described in greater detail below, FIG. 2 is similar to FIG. 1, but 5 with the four switches, 31–34, shown in their second states.

With continued reference to FIG. 1, the second switch 32 is connected to the first 21 and second 22 batteries and has a first state in which the negative terminal of the first battery 21 is connected to the negative terminal of the second battery 22, because of the common connection of both negative terminals to a point of ground potential, and a second state in which the negative terminal of the first battery 21 is connected to the positive terminal of the second battery 22.

The third switch 33 is connected to the second battery 22 and has a first state in which the positive terminal of the second battery 22 is connected to the source of charging power 10 and a second state in which the positive terminal of the second battery 22 is disconnected from the source of charging power 10.

A fourth switch 34 is connected to the second battery 22 and has a first state in which the negative terminal of the second battery 22 is connected to the negative terminal of the third battery 23, because of the connection of both negative terminals to a common point of ground potential, and a second state in which the negative terminal of the second battery 22 is connected to the positive terminal of the third battery 23.

When the relay coils, 41–44, are activated by a signal from the manually controlled electrically operated device, the four switches, 31–34, change from the first state shown in FIG. 1 to the second state shown in FIG. 2.

In FIG. 1, the manually controlled electrically operated device is represented by the joystick 60 which is used in combination with a control mechanism 62. A plurality of electric motors, 71–73, are activated and deactivated by the control mechanism 62 in response to commands received from the joystick 60 on the lines 81. Although many different connection configurations are possible, the joystick 60 can be connected to the control mechanism 62 in such a way that each physical position of the joystick is accompanied by a signal on a preselected and associated one of the plurality of signals lines 81. Many known types of joysticks are available which provide signals representing eight alternative directions and a ground connection. For example, with respect to the housing of the joystick, the eight positions can be located at the north, east, south, west, northeast, southeast, southwest, and northwest positions. A central position of the joystick, in which no direction is manually selected, can be represented by its own signal line or, alternatively, can be represented by an absence of signals on all of the signal lines 81. The particular arrangement used to connect the control mechanism 62 with the joystick 60 is not limiting to the present invention as long as the control mechanism 62 can distinguish between a manual direction selection and the absence of all direction selections. For purposes of describing the present invention, the absence of any directional command from the joystick 60 is considered an inactive state, whereas the presence of any direction command from the joystick 60 is considered an active state. As will be described in greater detail below, the active or inactive state of the joystick 60 will determine the energized or de-energized state of the relay coils 41–44 and, as a result, the position of the switches 31–34.

With continued reference to FIG. 1, a switch 90 is shown connecting a fourth battery 24 in electrical communication with the control mechanism 62. Switch 90 is used to connect the control mechanism 62 to the source of power when the switch 90 is closed. It should also be understood that the fourth battery 24 is associated with a starter mechanism of the internal combustion engine 12. Since the arrangement of a starter battery in conjunction with a starter of an internal combustion engine is very well known to those skilled in the art, the relation of these components will not be described in detail herein. However, it should be understood that the operation of the joystick 60 and its related control mechanism 62 is possible with the internal combustion engine 12 either operating or not operating. It is not necessary to deactivate the internal combustion engine 12 when the joystick 60 is used to dock the marine vessel. The three motors, 71–73, can be operated individually or in conjunction with each other to permit the operator of the marine vessel to dock the marine vessel with or without the internal combustion engine 12 operating.

With continued reference to FIG. 1, it can be seen that with the switches 31–34 in their normally closed positions as shown in the diagram, the three batteries 21–23 are connected in parallel with the negative terminals of batteries 21–23 being connected to a point of ground potential and a positive terminals of batteries 21–23 connected to the source of charging power 10. This creates a parallel connection in which the three actuating batteries 21–23 are connected in parallel between the source of charging power 10 and a point of ground potential.

FIG. 2 is similar to FIG. 1, but with the switches 31–34 shown in their second state. Each switch in FIG. 2 is in a different state than it is in FIG. 1. This is caused by the activation of the associated relay coils 41–44 by the control mechanism 62 in response to movement of the joystick 60 into an active state. In other words, when the joystick 60 is moved from its neutral position to one of the directional positions of the joystick, the relay coils 41–44 are switched from a deactivated to an activated condition to cause the switches 31–34 to assume the electrical positions shown in FIG. 2. If the joystick 60, on the other hand, is moved to a neutral position it is considered to be in an inactive state and the four relay coils 41–44 are de-energized.

With continued reference to FIG. 2, the positions of the switches 31–34 result in the three batteries 21–23 being connected in series with the control mechanism 62 to provide power to the motors 71–73. In this example, the motors require 36 volts DC. This necessitates the three 12 VDC batteries 21–23 being connected in series to provide that voltage. However, the charging system of the source of charging power 10 is 12 VDC and necessitates that the batteries 21–23 be connected in parallel during the charging operation. Therefore, when the motors 71–73 do not require electrical power because the joystick 60 is in an inactive condition, the batteries 21–23 are connected in parallel to receive charging voltage from the source of charging power 10. As soon as the joystick 60 is moved from its neutral or inactive position to an active position commanding a directional move by the motors 71–73, the batteries 21–23 are connected in series to provide this demanded power. The switching from the parallel connection of the batteries to the series connection of the batteries is accomplished by the energization of the is four relay coils 41–44.

Figure 3:
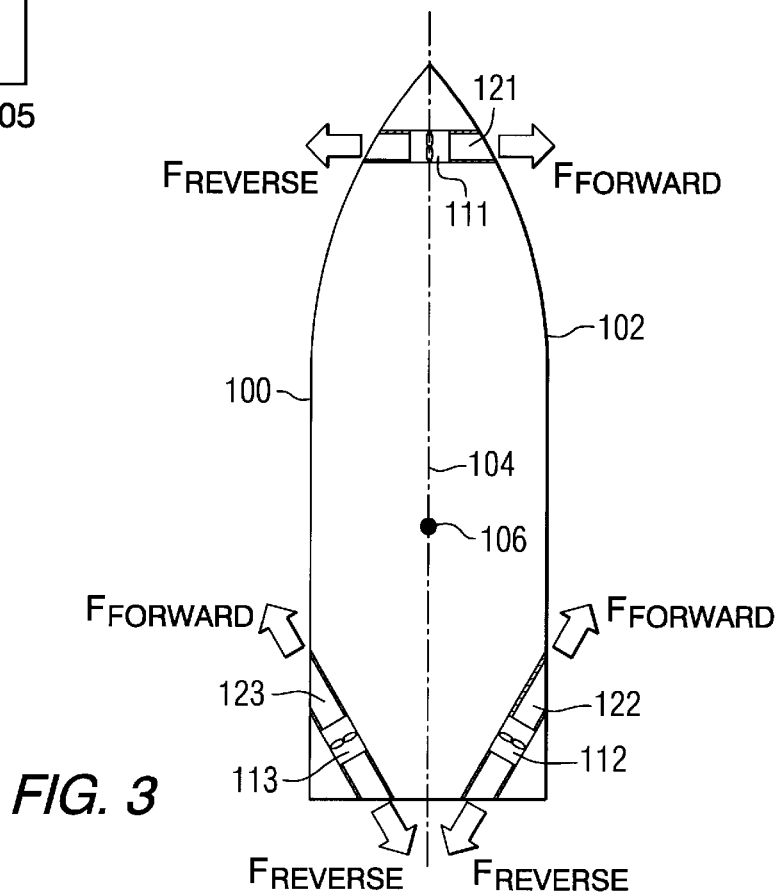
FIG. 3 is a schematic representation of a marine vessel with a plurality of motors and impellers of a docking system.

As described in detail in patent application Ser. No. 09/078,976 (M09248), an effective docking system can be provided through the use of three motors associated with three impellers. FIG. 3 is a representative illustration from that patent application which shows a marine vessel having a port side 100 and a starboard side 102, a centerline 104, and an effective center of gravity 106. Three motor driven impellers, 111, 112, and 113 are advantageously located in three associated tunnels, 121, 122, and 123 formed through the hull of the marine vessel. Each of the impellers is driven by an associated electric motor, such as those described above and identified by reference numerals 71–73 to satisfy the command. Each motor can be driven in a forward direction or in a reverse direction to result in the forces identified in FIG. 3. The control mechanism 62 receives the signals on lines 81 from the joystick 60 and establishes the effective forces required from each of the three electric motors 71–73. The techniques used to establish the required forward and reverse forces, shown in FIG. 3, as a function of the position of the joystick 60 will not be described in detail herein because of the extension description in the patent application cited immediately above.

In operation, it is expected that the operator of the marine vessel will use a primary propulsion system, such as the internal combustion engine 12, to maneuver the marine vessel to a position near a final docked position. Without having to turn the internal combustion engine off, the operator of the marine vessel can place the primary propulsion system in neutral gear and then begin to manipulate the joystick 60 to command the control mechanism 62 to selectively energize and de-energize the electric motors 71–72 to maneuver the marine vessel as desired.

Figure 4:
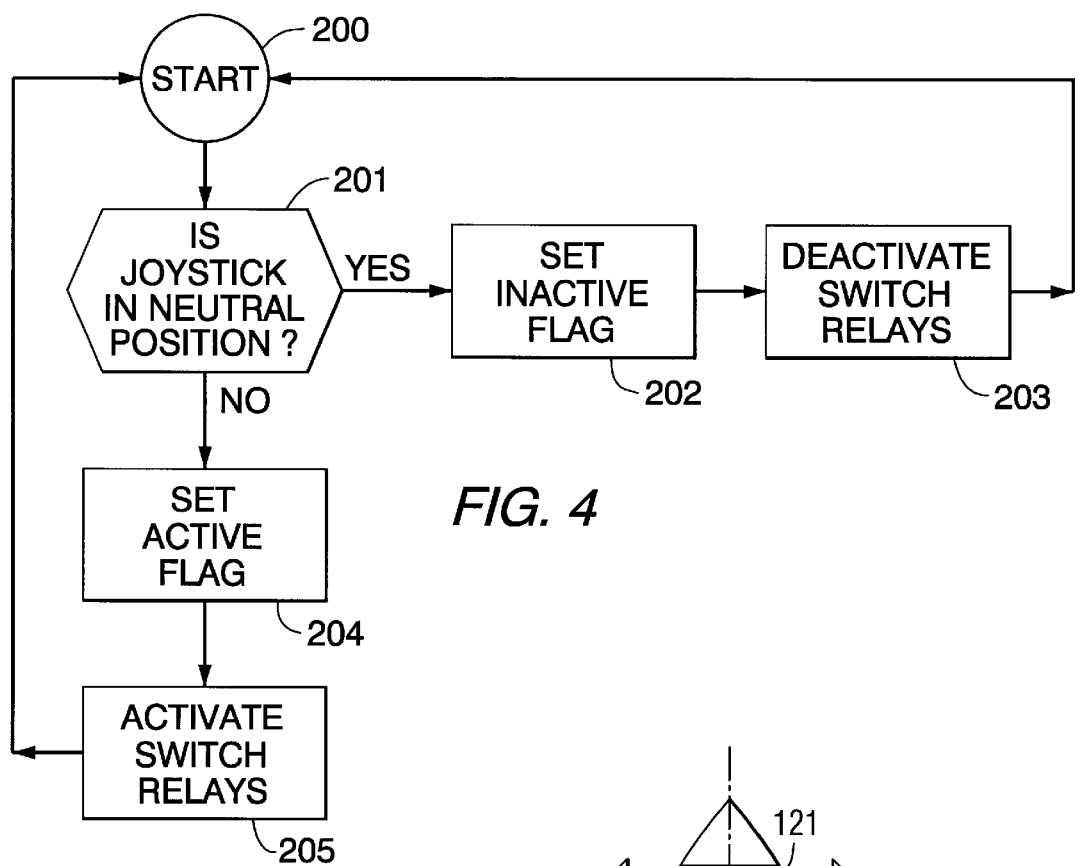
FIG. 4 is an exemplary flowchart showing how a plurality of switch relays are energized and de-energized as a function of the position of a manually controlled mechanism such as a joystick.

FIG. 4 shows an exemplary flow chart of a simple algorithm that can be used by a microprocessor within the control mechanism 62 to properly energize or de-energize the relay coils 41–44 in response to the activity or inactivity of the joystick 60, as represented by the signals on lines 81. In FIG. 4, a starting point 200 initiates the algorithm in which the joystick 60 is first interrogated to determine if it is in a neutral position. This is represented by functional block 201. This interrogation basically examines the lines 81 from the joystick 60 to determine if the joystick is in its central position, wherein the marine vessel operator is not requesting any movement of the marine vessel. If the joystick is in the neutral position, an inactive flag is set as represented by functional block 202 and the switch relay coils 41–44 are deactivated as represented by functional block 203. In other words, if the joystick 60 is in its neutral and inactive position, the batteries 21–23 are connected in a parallel arrangement with respect to the source of charging power 10 as shown in FIG. 1. If, on the other hand, the interrogation at functional block 201 determines that the joystick is not in its neutral position, the algorithm sets the active flag as represented by functional block 204 and activates the switch relay coils 41–44 as represented by functional block 205. The determination at functional block 201, which results in a negative response, can be caused by the energization of any of the control lines 81 from the joystick 60 which indicates that the joystick is in any position other than its neutral position. As an example, if the operator of the marine vessel moves the joystick 60 in any directional position, the answer to the interrogation of functional block 201 is negative and the algorithm executes functional blocks 204 and 205. As a result, the state of the relay coils 41–44 are dependent on the position of the joystick 60 and a resulting signal provided by the microprocessor of the control mechanism 62.

Although the present invention has been described in considerable detail and illustrated to show one particularly preferred embodiment, it should be understood that alternative embodiments are also within its scope.

I claim:

1. A battery switching circuit, comprising:
   a first battery having a positive terminal and a negative terminal;
   a second battery having a positive terminal and a negative terminal;
   a third battery having a positive terminal and a negative terminal;
   a source of charging power;
   a manually controlled electrically operated device having an active state and an inactive state;
   a first switch, connected to said first battery, having a first state in which said positive terminal of said first battery is connected to said source of charging power and a second state in which said positive terminal of said first battery is disconnected from said source of charging power;
   a second switch, connected to said first and second batteries, having a first state in which said negative terminal of said first battery is connected to said negative terminal of said second battery and a second state in which said negative terminal of said first battery is connected to said positive terminal of said second battery;
   a third switch, connected to said second battery, having a first state in which said positive terminal of said second battery is connected to said source of charging power and a second state in which said positive terminal of said second battery is disconnected from said source of charging power;
   a fourth switch, connected to said second battery, having a first state in which said negative terminal of said second battery is connected to said negative terminal of said third battery and a second state in which said negative terminal of said second battery is connected to said positive terminal of said third battery; and
   a switch controller for causing said first, second, third, and fourth switches to be in a first condition when said manually controlled electrically operated device is in said inactive state and for causing said first, second, third, and fourth switches to be in a second condition when said manually controlled electrically operated device is in said active state.

2. The circuit of claim 1, wherein:
   said first, second, third, and fourth switches are in said first state in said first condition and said first, second, third, and fourth switches are in said second state in said second condition.

3. The circuit of claim 1, further comprising:
   a fourth battery having a positive terminal and a negative terminal, said positive terminal of said fourth battery being connected to said source of charging power.

4. The circuit of claim 1, wherein:
   said positive terminal of said first battery is connected to said manually controlled electrically operated device.

5. The circuit of claim 1, wherein:
   said electrically operated device comprises an electric motor.

6. The circuit of claim 5, wherein:
   a rotor of said electric motor is attached to a marine propeller.

7. The circuit of claim 6, further comprising:
   a hand operable control mechanism connected in signal communication with said manually controlled electrically operated device.

8. The circuit of claim 7, wherein:
   said hand operable control mechanism is a joy stick.

9. The circuit of claim 1, wherein:
   said source of charging power is an alternator.

10. A battery switching circuit for a marine propulsion system, comprising:
    a first battery having a positive terminal and a negative terminal;
    a second battery having a positive terminal and a negative terminal;
    a third battery having a positive terminal and a negative terminal;
    a source of charging power;
    a fourth battery having a positive terminal and a negative terminal, said positive terminal of said fourth battery being connected to said source of charging power;
    a manually controlled electrically operated device having an active state and an inactive state;
    a first switch, connected to said first battery, having a first state in which said positive terminal of said first battery is connected to said source of charging power and a second state in which said positive terminal of said first battery is disconnected from said source of charging power;
    a second switch, connected to said first and second batteries, having a first state in which said negative terminal of said first battery is connected to said negative terminal of said second battery and a second state in which said negative terminal of said first battery is connected to said positive terminal of said second battery;
    a third switch, connected to said second battery, having a first state in which said positive terminal of said second battery is connected to said source of charging power and a second state in which said positive terminal of said second battery is disconnected from said source of charging power;
    a fourth switch, connected to said second battery, having a first state in which said negative terminal of said second battery is connected to said negative terminal of said third battery and a second state in which said negative terminal of said second battery is connected to said positive terminal of said third battery; and
    a switch controller for causing said first, second, third, and fourth switches to be in a first condition when said manually controlled electrically operated device is in said inactive state and for causing said first, second, third, and fourth switches to be in a second condition when said manually controlled electrically operated device is in said active state, said first, second, third, and fourth switches being in said first state in said first condition and said first, second, third, and fourth switches being in said second state in said second condition.

11. The circuit of claim 10, wherein:
said positive terminal of said first battery is connected to said manually controlled electrically operated device.

12. The circuit of claim 11, wherein:
said electrically operated device comprises an electric motor.

13. The circuit of claim 12, wherein:
a rotor of said electric motor is attached to a marine propeller.

14. The circuit of claim 13, further comprising:
a hand operable control mechanism connected in signal communication with said manually controlled electrically operated device.

15. The circuit of claim 14, wherein:
said hand operable control mechanism is a joy stick.

16. The circuit of claim 15, wherein:
said source of charging power is an alternator.

17. A battery switching circuit for a marine propulsion system, comprising:
an internal combustion engine;
a first battery having a positive terminal and a negative terminal;
a second battery having a positive terminal and a negative terminal;
a third battery having a positive terminal and a negative terminal;
a source of charging power driven by said internal combustion engine;
a fourth battery having a positive terminal and a negative terminal, said positive terminal of said fourth battery being connected to said source of charging power;
a manually controlled electrically operated device having an active state and an inactive state;
a plurality of electric motors connected in electrical communication with said manually controlled electrically operated device;
a first switch, connected to said first battery, having a first state in which said positive terminal of said first battery is connected to said source of charging power and a second state in which said positive terminal of said first battery is disconnected from said source of charging power;
a second switch, connected to said first and second batteries, having a first state in which said negative terminal of said first battery is connected to said negative terminal of said second battery and a second state in which said negative terminal of said first battery is connected to said positive terminal of said second battery;
a third switch, connected to said second battery, having a first state in which said positive terminal of said second battery is connected to said source of charging power and a second state in which said positive terminal of said second battery is disconnected from said source of charging power;
a fourth switch, connected to said second battery, having a first state in which said negative terminal of said second battery is connected to said negative terminal of said third battery and a second state in which said negative terminal of said second battery is connected to said positive terminal of said third battery; and
a switch controller for causing said first, second, third, and fourth switches to be in a first condition when said manually controlled electrically operated device is in said inactive state and for causing said first, second, third, and fourth switches to be in a second condition when said manually controlled electrically operated device is in said active state, said first, second, third, and fourth switches being in said first state in said first condition and said first, second, third, and fourth switches being in said second state in said second condition.

18. The circuit of claim 17, wherein:
said positive terminal of said first battery is connected to said manually controlled electrically operated device.

19. The circuit of claim 18, wherein:
a rotor of said at least one of said plurality of electric motors is attached to a marine impeller.

20. The circuit of claim 19, further comprising:
a hand operable control mechanism connected in signal communication with said manually controlled electrically operated device, said hand operable control mechanism being a joy stick.

21. A battery switching circuit, comprising:
a first battery having a positive terminal and a negative terminal;
a second battery having a positive terminal and a negative terminal;
a source of charging power;
a manually controlled electrically operated device having an active state and an inactive state;
a first switch, connected to said first battery, having a first state in which said positive terminal of said first battery is connected to said source of charging power and a second state in which said positive terminal of said first battery is disconnected from said source of charging power;
a second switch, connected to said first and second batteries, having a first state in which said negative terminal of said first battery is connected to said negative terminal of said second battery and a second state in which said negative terminal of said first battery is connected to said positive terminal of said second battery;
a third switch, connected to said second battery, having a first state in which said positive terminal of said second battery is connected to said source of charging power and a second state in which said positive terminal of said second battery is disconnected from said source of charging power; and
a switch controller for causing said first, second, and third switches to be in a first condition when said manually controlled electrically operated device is in s said inactive state and for causing said first, second, and third switches to be in a second condition when said manually controlled electrically operated device is in said active state, said first, second, and third batteries being connected in parallel between said source of charging power and a point of ground potential when in said first condition and said first, second, and third batteries being connected in series between said manually controlled electrically operated device and said point of ground potential when in said second condition.

22. The circuit of claim 21, further comprising:
a third battery having a positive terminal and a negative terminal, said positive terminal of said fourth battery being connected to said source of charging power, said third battery being connected to a starting motor of said internal combustion engine.

23. The circuit of claim 22, wherein:
said positive terminal of said first battery is connected to said manually controlled electrically operated device.

24. The circuit of claim 23 wherein:
said electrically operated device comprises an electric motor.

25. The circuit of claim 24 wherein:

a rotor of said electric motor is attached to a marine propeller.

26. The circuit of claim 25, further comprising:

a hand operable control mechanism connected in signal communication with said manually controlled electrically operated device.

27. The circuit of claim 26, wherein:

said hand operable control mechanism is a joy stick.

28. The circuit of claim 27, wherein:

said source of charging power is an alternator.

* * * * *